(12) United States Patent
Scharmüller

(10) Patent No.: US 7,275,754 B2
(45) Date of Patent: Oct. 2, 2007

(54) SUPPORT STRUCTURE FOR A HITCH BALL

(76) Inventor: Josef Scharmüller, Saxigen 14, 4892 Fornach (AT)

( * ) Notice: Subject to any disclaimer, the term of this patent is extended or adjusted under 35 U.S.C. 154(b) by 47 days.

(21) Appl. No.: 10/889,961

(22) Filed: Jul. 13, 2004

(65) Prior Publication Data

US 2005/0012301 A1    Jan. 20, 2005

Related U.S. Application Data

(60) Provisional application No. 60/487,184, filed on Jul. 14, 2003.

(30) Foreign Application Priority Data

Jul. 14, 2003   (AT)   ............................... A 1079/2003

(51) Int. Cl.
*B60D 1/14* (2006.01)
*B60D 1/56* (2006.01)

(52) U.S. Cl. ................ 280/495; 280/415.1; 280/416.1; 280/426.1; 280/491.5; 280/501; 280/511; 280/513

(58) Field of Classification Search ............. 280/415.1, 280/416.1, 426.1, 491.5, 501, 511–513, 477
See application file for complete search history.

(56) References Cited

U.S. PATENT DOCUMENTS

| 3,391,949 | A | * | 7/1968 | Abbott | .................... 280/416.2 |
| 3,716,253 | A | * | 2/1973 | Gniffke et al. | ........... 280/416.2 |
| 4,340,240 | A | * | 7/1982 | Anderson | ................ 280/461.1 |
| 4,502,706 | A | * | 3/1985 | Frambach, Sr. | .......... 280/416.2 |
| 4,921,266 | A | * | 5/1990 | Beals | ....................... 280/415.1 |
| 5,087,064 | A | * | 2/1992 | Guhlin | ....................... 280/507 |
| 5,465,992 | A | * | 11/1995 | Anderson | ................... 280/477 |
| 5,690,182 | A | * | 11/1997 | Ward | ........................... 172/439 |
| 5,951,035 | A | * | 9/1999 | Phillips, Jr. et al. | ........ 280/477 |
| 5,984,019 | A | * | 11/1999 | Hund | ........................ 172/439 |
| 6,120,052 | A | * | 9/2000 | Capik et al. | ................ 280/477 |
| 6,125,945 | A | | 10/2000 | Skaggs et al. | |
| 6,178,650 | B1 | * | 1/2001 | Thibodeaux | ................. 33/286 |
| 6,361,062 | B1 | * | 3/2002 | Edin et al. | ............... 280/416.2 |
| 6,533,042 | B1 | * | 3/2003 | Marine, Sr. et al. | ........ 172/272 |
| 6,698,256 | B2 | * | 3/2004 | Witchey | ........................ 70/14 |

FOREIGN PATENT DOCUMENTS

DE    24 03 077 A    9/1974

\* cited by examiner

*Primary Examiner*—Lesley D. Morris
*Assistant Examiner*—Marlon Arce-Diaz
(74) *Attorney, Agent, or Firm*—Henry M. Feiereisen

(57) ABSTRACT

Support structure (1) for a hitch ball (61) and a depressor (62), wherein a fastening mechanism (2) is provided for securement to a carrier (81) by means of quick-action coupling.

11 Claims, 5 Drawing Sheets

SUPPORT STRUCTURE FOR A HITCH BALL

CROSS-REFERENCES TO RELATED APPLICATIONS

This application claims the benefit of prior filed U.S. provisional Application No. 60/487,184, filed Jul. 14, 2003, pursuant to 35 U.S.C. 119(e), the disclosure of which is incorporated herein by reference.

This application claims the priority of Austrian Patent Application, Serial No. A 1079/2003, filed Jul. 14, 2003, pursuant to 35 U.S.C. 119(a)-(d), the disclosure of which is incorporated herein by reference.

BACKGROUND OF THE INVENTION

The present invention relates, in general, to a support structure for a hitch ball of a coupling mechanism.

Support structures of a type involved here typically have a carrier which supports a hitch ball of a trailer coupling and is firmly mounted to a towing vehicle. A drawback is hereby the relatively long times required for modification when attachment of other coupling systems and/or other implements that are connected to the towing vehicle is desired. Another approach involves a support structure having a bearing block for receiving a slide-in unit on which the hitch ball is mounted. As a result, inserts with other coupling elements can be used instead of the hitch ball. A drawback is hereby the small load-carrying capacity of the support structure and the limited space available for attachment of other implements to the towing vehicle in view of the incorporation of the bearing block.

It would therefore be desirable and advantageous to provide an improved support structure to obviate prior art shortcomings and to allow simple and quick retrofitting.

SUMMARY OF THE INVENTION

According to one aspect of the present invention, a support structure includes a support unit for carrying a hitch ball intended for attachment of a component, wherein the support unit has a fastening mechanism for securement of the support unit to a carrier through intervention of a quick-action coupling.

The present invention resolves prior art problems by connecting the support unit to the carrier via a quick-action coupling of the carrier which is mounted to a towing vehicle. As a consequence, the support structure can be connected easily and rapidly to the towing vehicle, and there is no need to connect the hitch ball to the towing vehicle, unless required for attachment of, for example, a trailer. The quick-action coupling can be used for other implements, thereby realizing a wide range of applications of the towing vehicle while keeping retrofitting times short. The support structure according to the present invention can be completely removed from the carrier so that no interfering parts remain on the towing vehicle when other implements are intended for attachment. The support structure and the carrier can be subjected to high loads so that the hitch ball can be used also for heavy trailers, machines or the like. The area around the hitch ball is free of attachments so as to ensure a great pivoting range of a drawbar eye that is connected to the hitch ball. A great pivoting range enhances also the maneuvering capability and safety of the towing vehicle and a trailer, a machine or the like.

According to another feature of the present invention, the support unit includes a hitch bar having opposite first and second ends, wherein the fastening mechanism may include a first bolt element projecting from the first end of the hitch bar and constructed for placement in a receptacle of the carrier, a second bolt element projecting from the second end in substantial coaxial relationship to the first bolt element and constructed for placement in another receptacle of the carrier, and a fastening element in spaced-apart relationship to the first and second bolt elements for attachment to a latch of the carrier. In this way, a simple and stable construction of the fastening mechanism is realized for interaction with the quick-action coupling of the carrier.

According to another feature of the present invention, the fastening element may be spaced from the first bolt element at a distance which essentially corresponds to a distance of the fastening element from the second bolt element. This symmetric arrangement permits an even load distribution so that the support structure can be subjected to high loads.

According to another feature of the present invention, the support unit may include a frame which is detachably connected to the hitch bar between the first and second ends, with the fastening element being provided on the frame. Suitably, the fastening element is formed integral on the frame. As a consequence, fastening elements for different quick-action mountings can be connected to the hitch bar in a simple manner. Furthermore, the support structure can be suited to the demands of different operations by simply replacing the frame with another frame.

According to another feature of the present invention, the frame may have an opening for passage of a cardan shaft. As a result, the support structure can be used also for implements with a drive through intervention of the cardan shaft.

According to another feature of the present invention, the hitch bar is constructed for attachment of the hitch ball, wherein the support unit may include at least one further frame which is detachably connected to the hitch bar at an angle different from an angular disposition of the other frame upon the hitch bar for realizing different angular dispositions of the hitch ball. In this way, the support structure can be suited to different operations and/or different implements, thereby improving safety and deflection capability of the coupling, when being engaged.

According to another feature of the present invention, the fastening element may be configured as a fastening eyelet. A fastening eyelet represents a particularly simple and proven construction for the fastening element.

According to another feature of the present invention, a coupling jaw may be connected to the hitch bar to provide guidance during engagement of a drawbar eye to the hitch ball. The coupling jaw thus facilitates a proper positioning of the drawbar eye during engagement. It may also be conceivable to provide a trigger element for effecting automatic engagement of the drawbar eye to the hitch ball. In this way, engagement can be executed solely by the operator. In other words, the operator is not required to leave the operator's cab of the towing vehicle.

According to another feature of the present invention, the hitch bar may have a threaded bore for receiving a threaded portion of the hitch ball, thereby realizing an especially secure hold and great load-bearing capability of the hitch ball. This assures high safety of the support structure.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
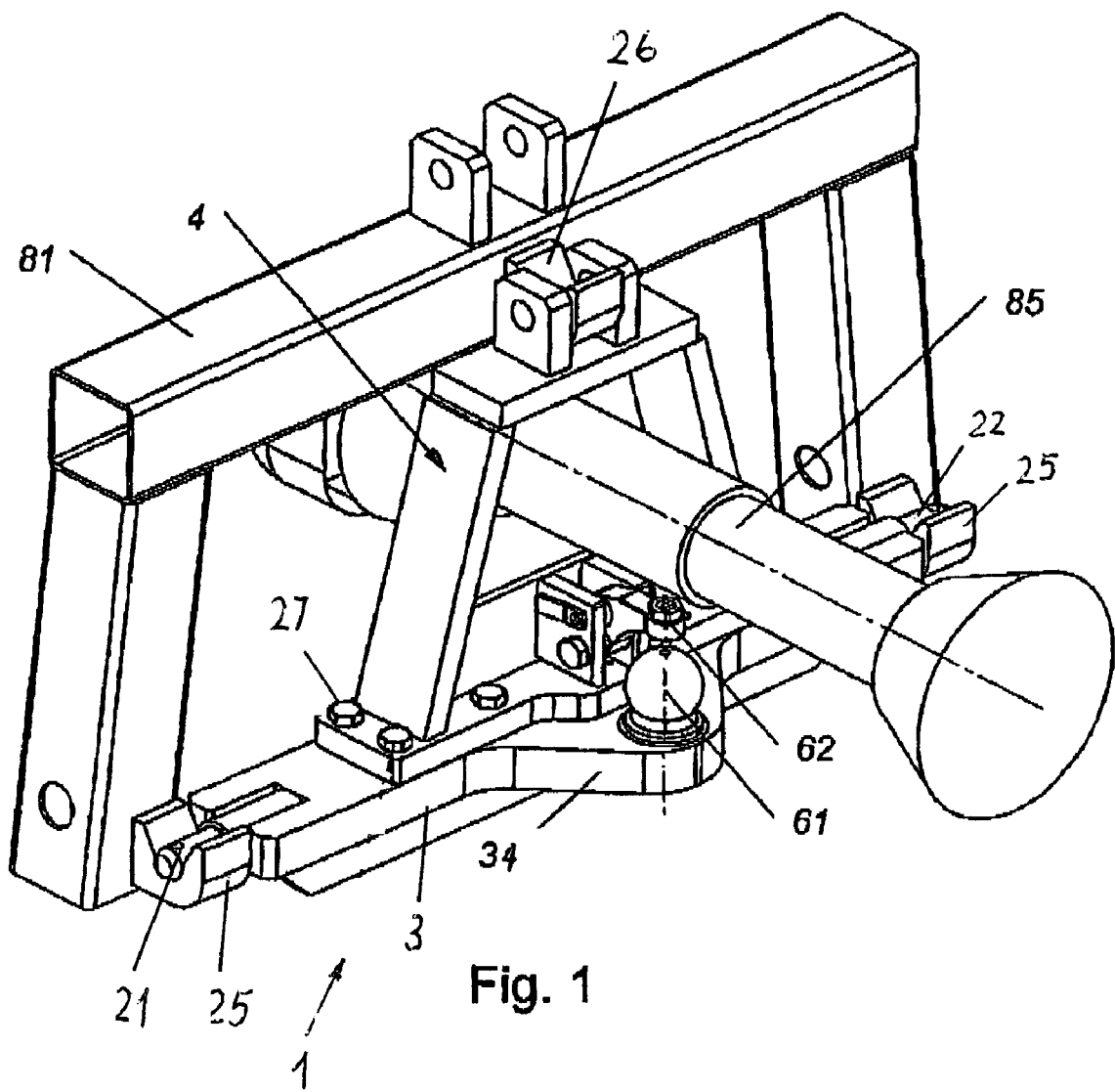
FIG. 1 is an oblique view of a support structure according to the present invention for attachment to a carrier and provided with a first variation of a frame.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an oblique view of a first embodiment of a support structure according to the present invention, generally designated by reference numeral 1, for support of a hitch ball 61 for attachment of, e.g., a trailer. The support structure 1 is connectable to a carrier 81 via a quick-action coupling. The carrier 81 may hereby be mounted to a towing vehicle (not shown) and intended for receiving different implements by means of the quick-action coupling. The quick-action coupling enables hereby a rapid and simple exchange of the implements. The hitch ball 61 carried by the support structure 1 is connected to the carrier 81 on the towing vehicle only when required for towing a trailer for example, so that a direct connection of other implements to the rear of the towing vehicle is not interfered with. In other words, when the entire support structure 1 is removed from the carrier 81, there are no parts obstructing other implements that remain connected to the towing vehicle.

Figure 2:
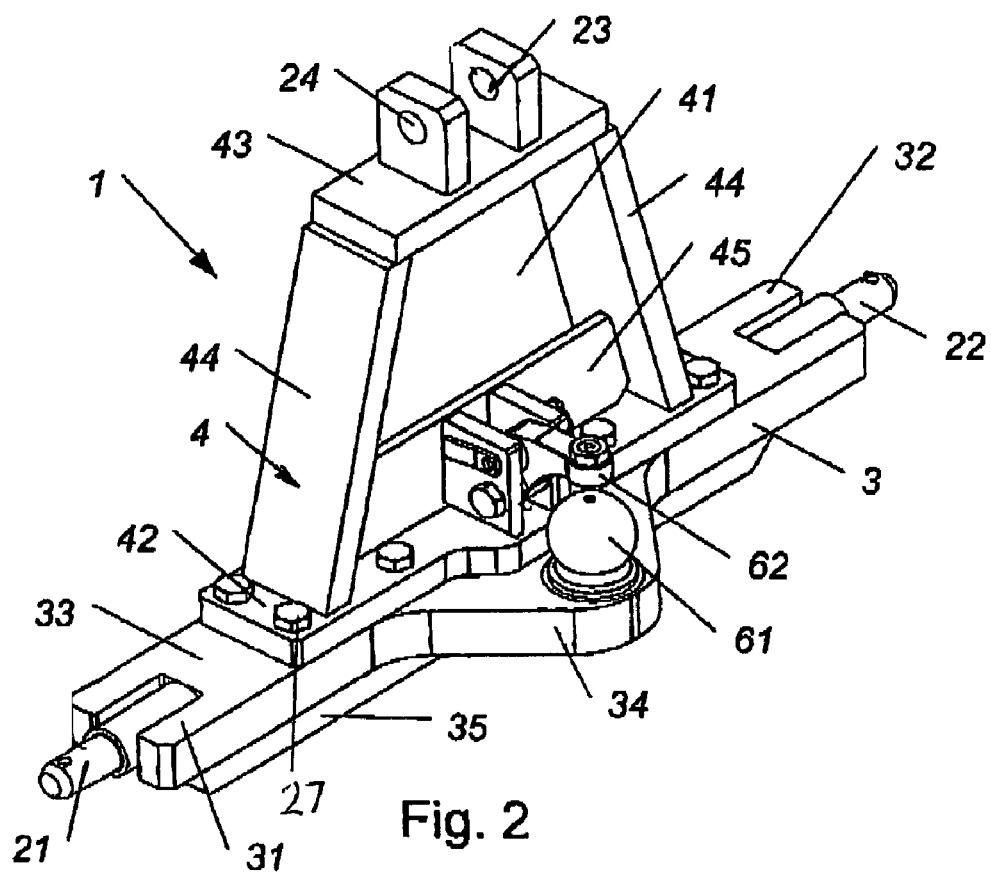
FIG. 2 is an oblique view of the support structure of FIG. 1.

As shown in conjunction with FIG. 2, the support structure 1 includes a support unit having a hitch bar 3 with a projection 34 in midsection for attachment of the hitch ball 61, and an exchangeable frame, generally designated by reference numeral 4. The arrangement of the projection 34 allows a greater distance of the hitch ball 61 from the carrier 81 and thus ensures a sufficient freedom of movement of a drawbar eye once connected to the hitch ball 61. Suitably, the projection 34 is formed integral with the hitch bar 3 to attain a substantial load-bearing capability of the support structure 1. The hitch ball 61 is thus connected directly to the hitch bar 3. Suitably, the stability of the hitch bar 3 can be further enhanced by a support element 35 secured to the underside of the hitch bar 3.

The frame 4 includes a bottom plate 42 which is detachably connected to a top surface 33 of the hitch bar 3 via respective screw fasteners 27. Secured to the bottom plate 42 are two inclined sidewalls 44 which converge to support a top plate 43. A reinforcement element 45 extends between the sidewalls 44 and supports a bearing for a depressor 62 for securement of a drawbar eye (not shown) upon the hitch ball 61. The frame 4 includes an opening 41 for passage of a cardan shaft 85 which allows attachment of a wide range of other implements to the support structure 1. Although not shown in detail, the individual components of the frame 4 may form a single-piece construction or may be connected in any suitable manner known to the artisan, e.g. through welding.

The hitch bar 3 defines a longitudinal axis and has opposite axial end portions 31, 32. The hitch bar 3 is connectable to the carrier 81 by a fastening mechanism which includes a first bolt element 21 extending out from the end portion 31, a second bolt element 22 extending out from the end portion 32 in substantial coaxial relationship to the second bolt element 22, and a fastening element 23 connected to the top plate 43 of the frame 4 and thus situated in spaced-apart relationship to the hitch bar 3. The fastening element 23 may hereby be formed integral with the top plate 43. The bolt elements 21, 22 are rotatably received in open-topped complementary U-shaped receptacles 25 of the carrier 81, whereas the fastening element 23 is rotatably received by a receptacle in the form of a hook-shaped latch 26 of the carrier 81. The receptacles 25, 26 establish hereby together the quick-action coupling between the support structure 1 and the carrier 81. The hitch bar 3 is thus rotatably connected to the carrier 81 so as to realize an effective load distribution between the bolt elements 21, 22 and the fastening member 23. Normal forces acting on the longitudinal axis of the hitch bar 3 are thus absorbed essentially by the bolt elements 21, 22, and forces as a result of torsion of the hitch bar 3 are absorbed essentially by the fastening element 23. These different loads can be taken into account in particular when dimensioning these components.

In order to realize an even force distribution between the bold elements 21, 22, the fastening element 23 is spaced from the bolt element 21 at a distance which corresponds essentially to a distance of the fastening element 23 from the bolt element 22. This results in a substantially symmetric arrangement. Although this spatial relationship of the fastening element 23 from the bolt elements 21, 22 is a currently preferred embodiment, different distances are, of course, conceivable as well.

The fastening element 23 is implemented, by way of example, in the form of parallel fastening eyelets 24 which are interconnected by a bolt (not shown) for placement into the hook-shaped latch 26. As an alternative, it is also possible to configure the fastening element 23 as bolt defined by an axis in substantial parallel relationship to the bolt elements 21, 22 or in perpendicular relationship thereto. Configuration of the fastening mechanism and its arrangement depends essentially on the configuration of the quick-action coupling provided on the carrier 81.

Figure 3:
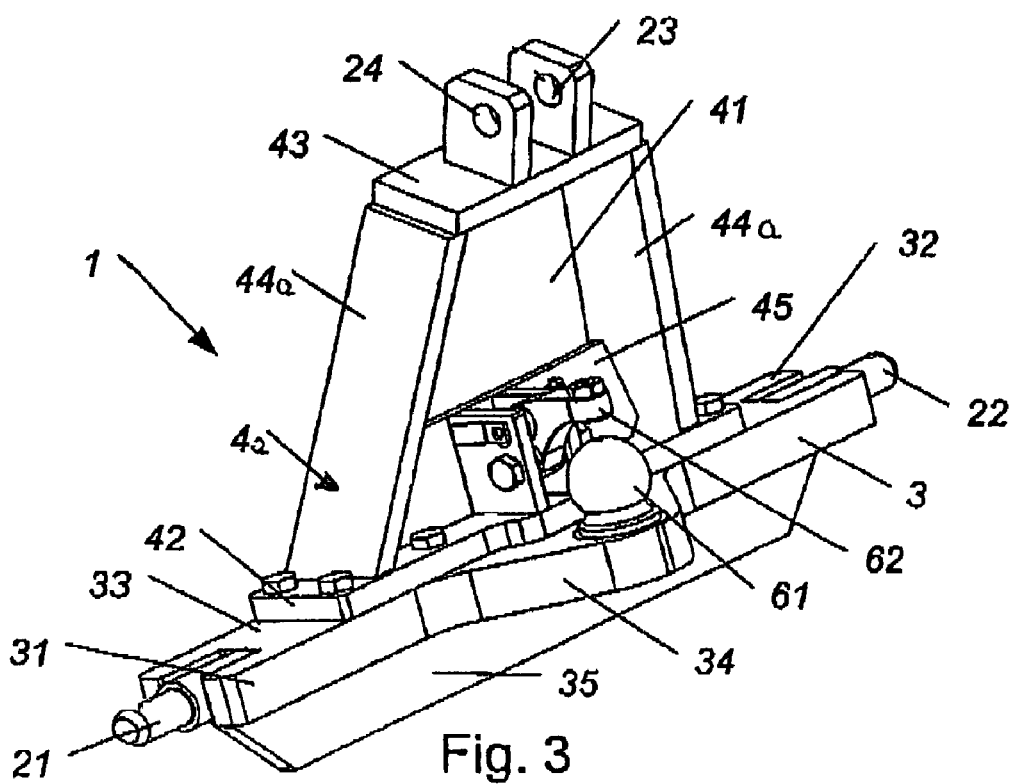
FIG. 3 is an oblique view of the support structure according to the present invention with a second variation of a frame.

Referring now to FIG. 3, there is shown an oblique view of the support structure 1 having a frame 4a which results in a different angular disposition of the hitch ball 61. The frame 4a has sidewalls 44a constructed for connection to the hitch bar 3 at an inclination so that, compared to the embodiment of FIG. 2, the hitch ball 61 assumes an inclined disposition in relation to the horizontal, when the support structure 1 is attached via the quick-action coupling 25, 26 to the carrier 81. Thus, the support structure 1 of FIG. 2 can be converted into the support structure 1 according to FIG. 3 by simply substituting the frame 4 with the frame 4a in order to change the angular disposition of the hitch ball 61. Currently preferred is an angular disposition of about 20° in relation to the horizontal. The angular disposition of the hitch ball 61 is thus proportional to the angle between the plane defined by the bolt elements 21, 22 and the fastening element 23, on the one hand, and the top surface 33 of the hitch bar 3. In the non-limiting example of FIG. 3, the angle of inclination of the frame 4a is about 70°, resulting thus in an angular disposition of the hitch ball 61 of about 20°.

Figure 4:
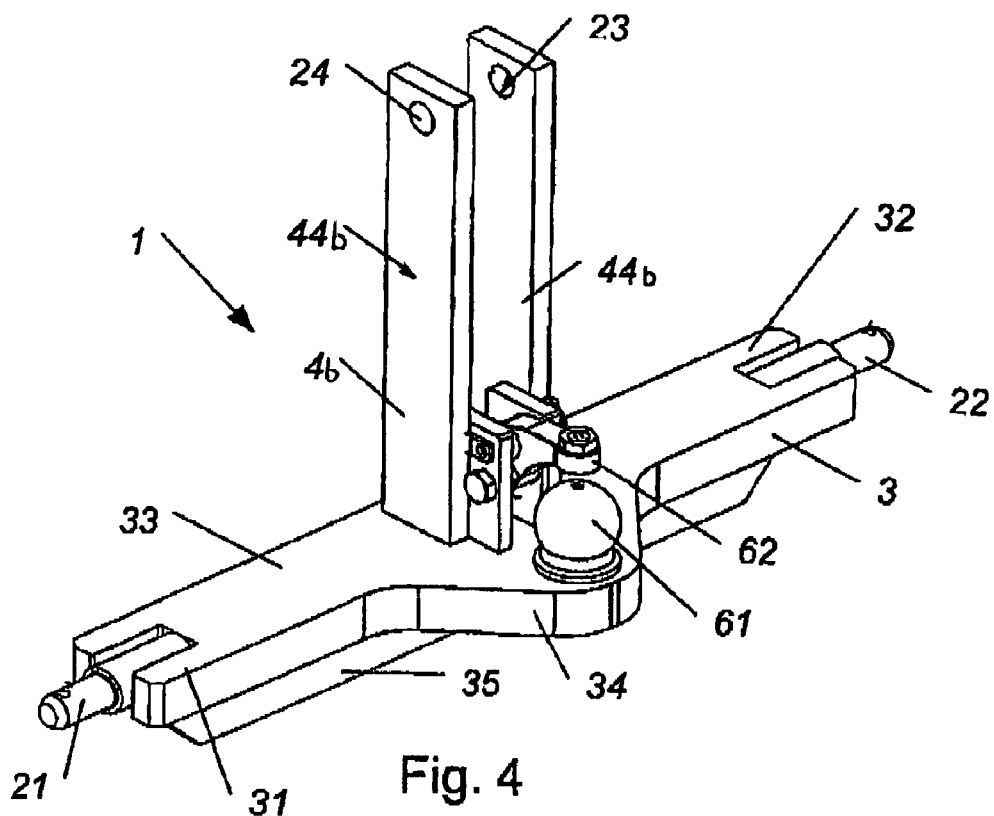
FIG. 4 is an oblique view of the support structure according to the present invention with a third variation of a frame.

FIG. 4 shows the attachment of another frame, generally designated by reference numeral 4b for securement to the hitch bar 3 of the support structure 1. The frame 4b is constructed here only in the form of two upright sidewalls 44b for detachable securement to the hitch bar 3, with the eyelets 24 of the fastening element 23 integrated in the sidewalls 44. Although not shown in the drawing, the provision of a frame with single sidewall is also conceivable.

Figure 5:
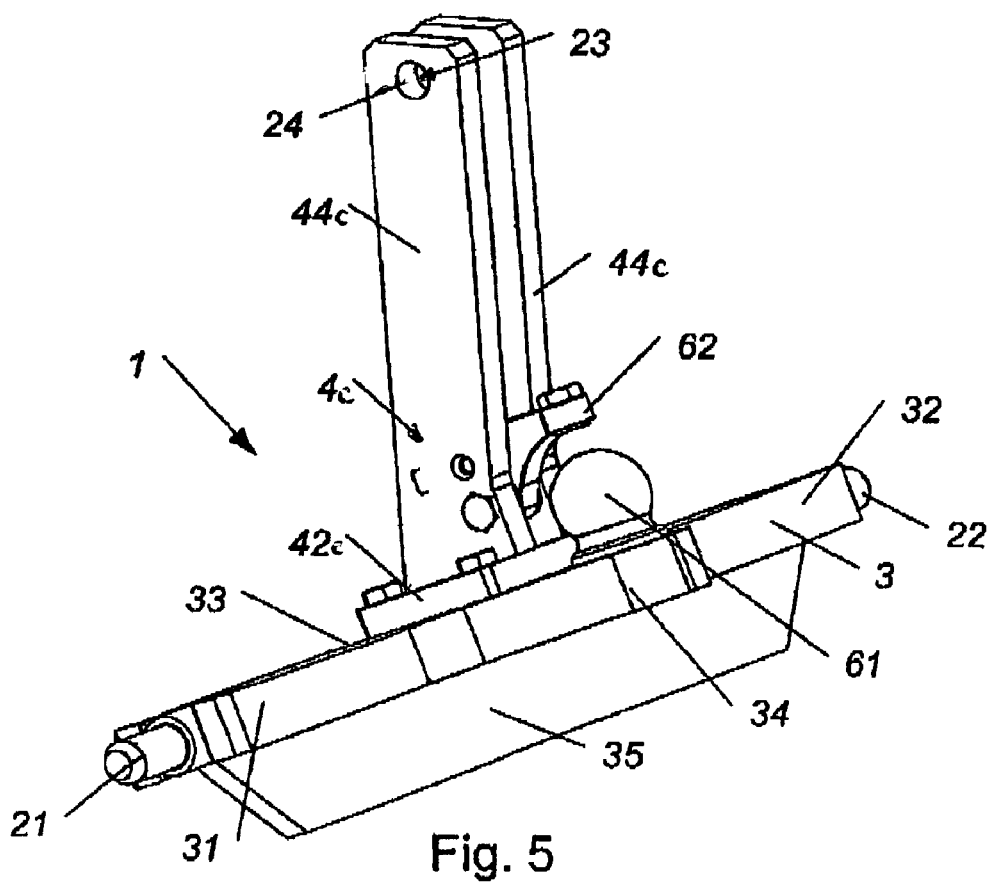
FIG. 5 is an oblique view of the support structure according to the present invention with a fourth variation of a frame.

FIG. 5 shows the attachment of still another frame, generally designated by reference numeral 4c for securement to the hitch bar 3 of the support structure 1. The frame 4c is constructed here to effect a different angular disposition of the hitch ball 61. The frame 4c includes a short bottom plate 42c which is detachably mounted to the hitch bar 3 and supports two inclined sidewalls 44c.

Figure 6:
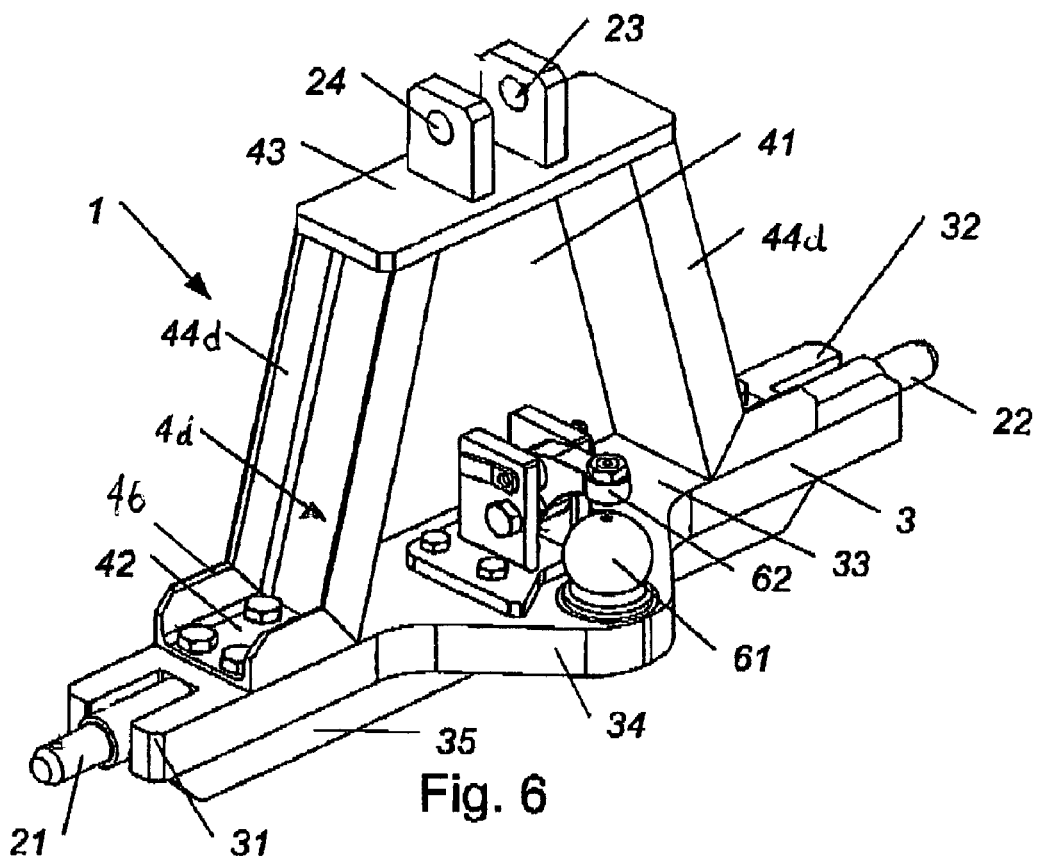
FIG. 6 is an oblique view of the support structure according to the present invention with a fifth variation of a frame.

FIG. 6 shows the attachment of yet another type of frame, generally designated by reference numeral 4d for securement to the hitch bar 3 of the support structure 1. The frame 4d has U-shaped sidewalls 44d which have ends bent outwards to form flanges 46 for detachable securement to the top surface 33 of the hitch bar 3.

Figure 7:
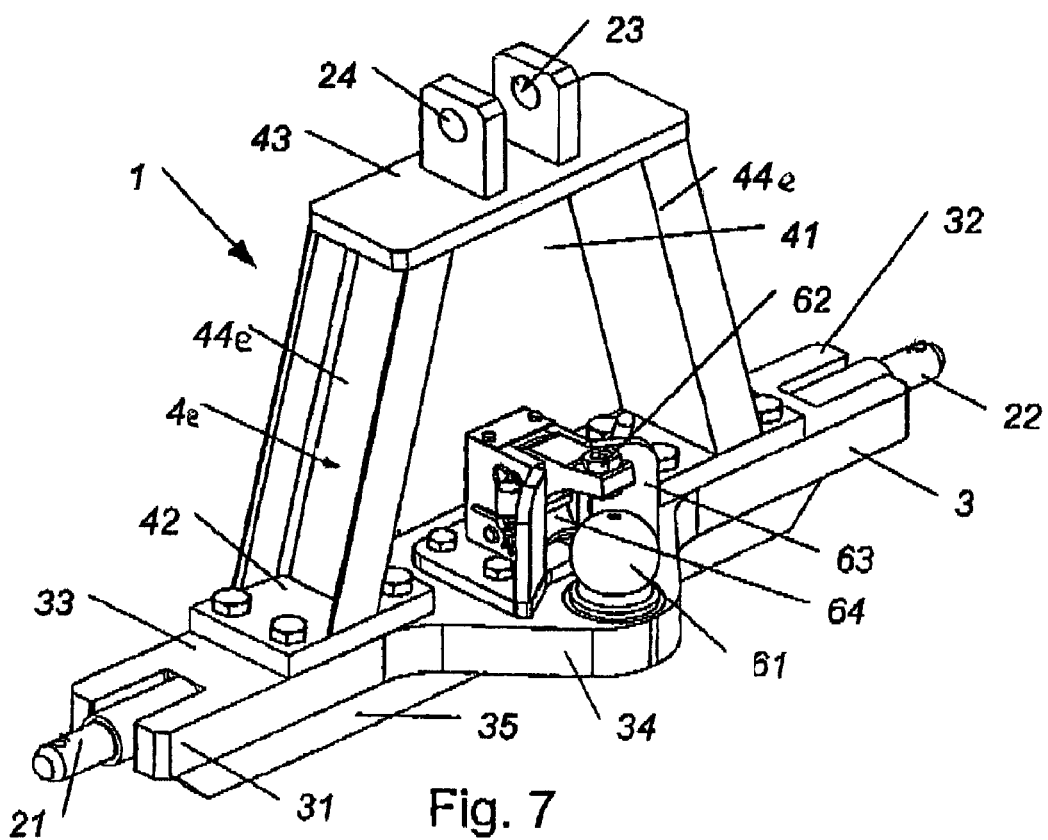
FIG. 7 is an oblique view of the support structure according to the present invention with a sixth variation of a frame.
Figure 8:
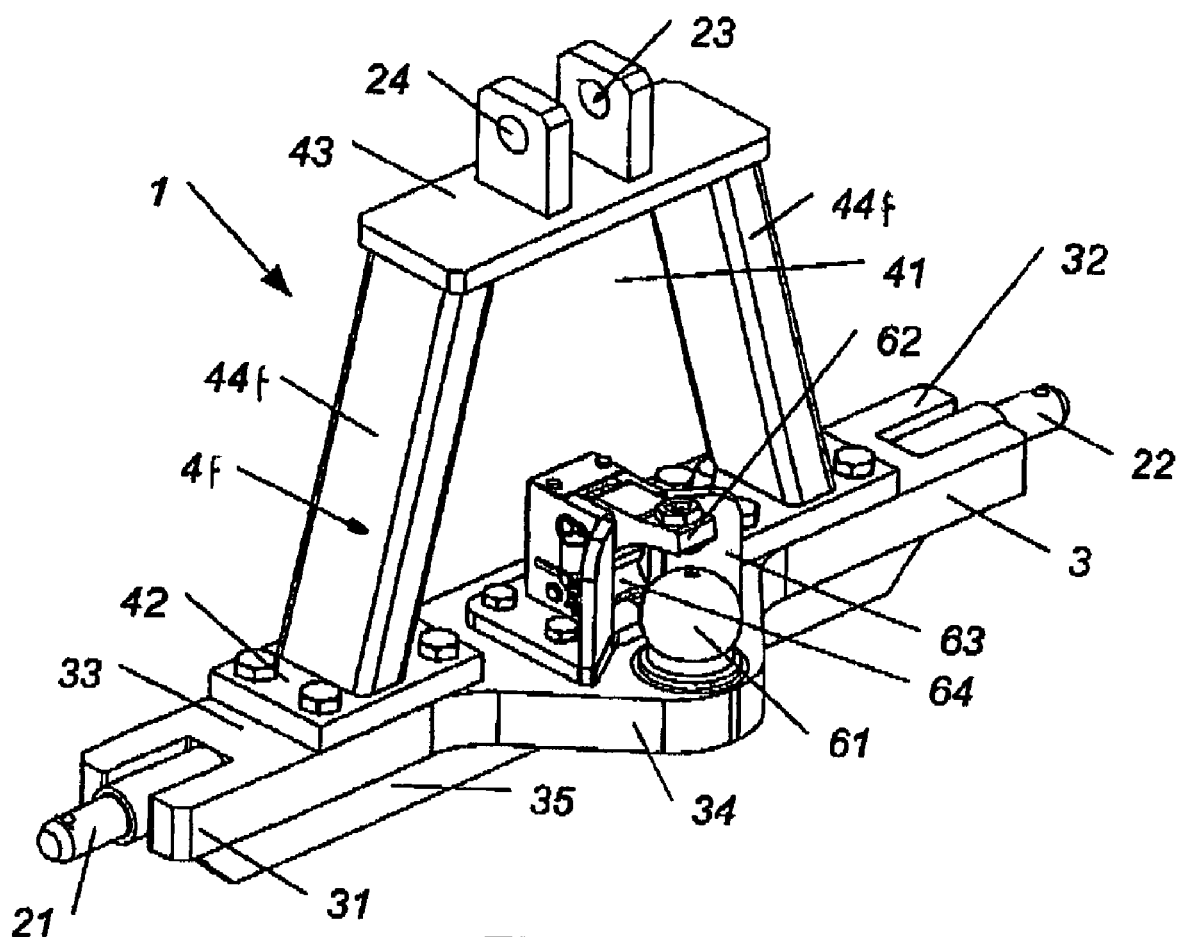
FIG. 8 is an oblique view of the support structure according to the invention with a seventh variation of a frame.

FIG. 7 shows the attachment of yet another type of frame, generally designated by reference numeral 4e for securement to the hitch bar 3 of the support structure 1. The frame 4e has U-shaped sidewalls 44e which end in bottom plates 42 that are detachably secured to the top surface 33 of the hitch bar 3. In addition, coupling jaws 63 are provided on the hitch bar 3 as guides for a drawbar eye to be connected with the hitch ball 61 during engagement, so that the drawbar eye can easily be placed over the hitch ball 61. FIG. 8 shows a frame 4f which is similar to the frame 4e of FIG. 7 but has solid sidewalls 44f, instead of U-shaped sidewalls. Coupling jaws 63 are also provided here.

The support structure 1 according to FIGS. 7 and 8 is further provided with a trigger element 64 which is operated by the drawbar eye and provides automatic engagement of the drawbar eye to the hitch ball 61. The drawbar eye actuates hereby during engagement the depressor 62 which thus fixes the drawbar eye upon the hitch ball 61.

In the embodiments, shown in FIGS. 1 to 8, the angular disposition of the hitch ball 61 is proportional to the angle between the plane, including the bolt elements 21, 22 and the fastening element 23, and the plane of the top surface 33.

Figure 9:
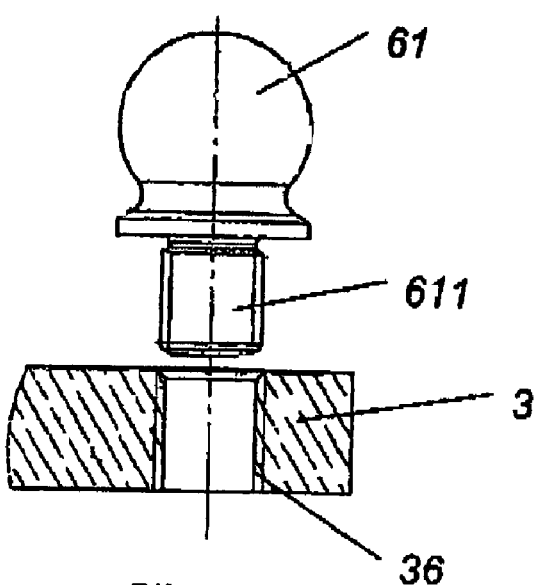
FIG. 9 is a partially sectional view of a hitch bar in combination with a hitch ball.

Referring now to FIG. 9, there is shown a currently preferred securement of the hitch ball 61 to the hitch bar 3. The hitch ball 61 includes a threaded portion 611 which is received in a threaded bore 36 of the hitch bar 3. Suitably, the threaded bore 36 is formed in the projection 34. The screwed connection between the threaded portion 611 and the threaded bore 36 results in an especially stable and secure fit of the hitch ball 61.

The embodiments referred to in the description are not limited, whereby especially features of several of the described embodiments may be mutually exchanged and/or combined with one another.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A support structure, comprising a support unit for carrying a hitch ball for attachment of a component, said support unit comprising:

a hitch bar having opposite first and second ends, a fastening mechanism for securement of the support unit to a carrier through intervention of a quick-action coupling, said fastening mechanism comprising a first bolt element projecting from the first end of the hitch bar and constructed for placement in a receptacle of the carrier, a second bolt element projecting from the second end in substantial coaxial relationship to the first bolt element and constructed for placement in another receptacle of the carrier, and a fastening element in spaced-apart relationship to the first and second bolt elements for attachment to a latch of the carrier, and a frame detachably connected to the hitch bar between the first and second ends, said fastening element being provided on the frame.

2. The support structure of claim 1, wherein the fastening element is spaced from the first bolt element at a distance which essentially corresponds to a distance of the fastening element from the second bolt element.

3. The support structure of claim 1, wherein the fastening element is formed integral on the frame.

4. The support structure of claim 1, wherein the frame has an opening for passage of a cardan shaft.

5. The support structure of claim 1, wherein the hitch bar is constructed for attachment of the hitch ball, said support unit including at least one further frame detachably connected to the hitch bar at an angle different from an angular disposition of the frame upon the hitch bar for realizing different angular dispositions of the hitch ball.

6. The support structure of claim 5, wherein the further frame has an angle of inclination in relation to the hitch bar of 70° so as to change the angular disposition of the hitch ball by 20°.

7. The support structure of claim 1, wherein the fastening element is configured as fastening eyelet.

8. The support structure of claim 1, wherein the component is a drawbar eye, and further comprising a coupling jaw connected to the hitch bar to provide guidance during engagement of the drawbar eye to the hitch ball.

9. The support structure of claim 1, wherein the component is a drawbar eye, and further comprising a trigger element for automatic engagement of the drawbar eye to the hitch ball.

10. The support structure of claim 1, wherein the hitch bar has a threaded bore for receiving a threaded portion of the hitch ball.

11. The support structure of claim 1, further comprising a depressor for securement of a drawbar eye upon the hitch ball.

* * * * *